United States Patent
Parmeter et al.

(10) Patent No.: US 9,800,110 B2
(45) Date of Patent: Oct. 24, 2017

(54) SYSTEM AND METHOD FOR ENHANCED MAGNET WIRE INSULATION

(71) Applicant: Summit ESP, LLC, Tulsa, OK (US)

(72) Inventors: Larry Parmeter, Broken Arrow, OK (US); Brett Leamy, Claremore, OK (US); Keith Johnson, Claremore, OK (US); David Lunk, Big Cabin, OK (US)

(73) Assignee: SUMMIT ESP, LLC, Tulsa, OK (US)

(*) Notice: Subject to any disclaimer, the term of this patent is extended or adjusted under 35 U.S.C. 154(b) by 681 days.

(21) Appl. No.: 13/834,270

(22) Filed: Mar. 15, 2013

(65) Prior Publication Data
US 2013/0278117 A1     Oct. 24, 2013

Related U.S. Application Data

(60) Provisional application No. 61/636,003, filed on Apr. 20, 2012.

(51) Int. Cl.
*H02K 3/30* (2006.01)
*H02K 3/44* (2006.01)
(Continued)

(52) U.S. Cl.
CPC .............. *H02K 3/30* (2013.01); *H01B 3/306* (2013.01); *H01B 3/427* (2013.01); *H01B 7/292* (2013.01);
(Continued)

(58) Field of Classification Search
CPC  H02K 3/30; H02K 3/32; H02K 3/325; H02K 3/34; H02K 3/345; H02K 3/44;
(Continued)

(56) References Cited

U.S. PATENT DOCUMENTS 3,417,593 A    12/1968  Lewis
3,505,729 A     4/1970  Balke et al.
(Continued)

FOREIGN PATENT DOCUMENTS

CN    101667470 A    3/2010
EP     0040034 A1   11/1981
(Continued)

OTHER PUBLICATIONS

Bascou et al., Machine Translation of EP0197227, Oct. 1986.*
(Continued)

*Primary Examiner* — Quyen Leung
*Assistant Examiner* — Eric Johnson
(74) *Attorney, Agent, or Firm* — Frederic Dorwart, Lawyers PLLC; Penina Michlin Chiu

(57) ABSTRACT

A system and method for enhanced magnet wire insulation is described. The system of the invention provides an enhanced insulation for magnet wire that is capable of withstanding high temperatures and provides a seal against water that is needed in electric submersible pump (ESP) applications. The enhanced insulation of the system of the invention provides the dielectric advantages of polyimide tape, such as Kapton tape, while also including the advantages of organic polymer thermoplastic insulation that prevents the delaminating at high temperatures that may occur in pumping applications using a variety of electrical submersible motors.

2 Claims, 4 Drawing Sheets

(51) Int. Cl.
*H02K 3/46* (2006.01)
*H01B 7/29* (2006.01)
*H01B 3/30* (2006.01)
*H01B 3/42* (2006.01)
*H02K 5/132* (2006.01)

(52) U.S. Cl.
CPC ............... *H02K 3/44* (2013.01); *H02K 3/46* (2013.01); *H02K 5/132* (2013.01); *Y10T 29/49009* (2015.01)

(58) Field of Classification Search
CPC .......... H01B 7/29; H01B 7/292; H01B 3/306; H01B 3/427
See application file for complete search history.

(56) References Cited

U.S. PATENT DOCUMENTS

| | | | |
|---|---|---|---|
| 3,842,192 A | | 10/1974 | Hilker et al. |
| 4,515,993 A | * | 5/1985 | MacKenzie ............ H01B 7/046 174/102 R |
| 4,808,966 A | * | 2/1989 | Ferlier ................... B44B 7/002 219/121.68 |
| 4,833,354 A | * | 5/1989 | Miller ..................... H02K 3/38 310/260 |
| 5,326,935 A | | 7/1994 | Yamaguchi et al. |
| 5,362,925 A | | 11/1994 | Yamaguchi et al. |
| 5,393,929 A | * | 2/1995 | Yagihashi ............... B32B 27/08 174/102 R |
| 5,476,229 A | | 12/1995 | Ishikawa |
| 5,845,709 A | | 12/1998 | Mack et al. |
| 5,861,578 A | | 1/1999 | Hake et al. |
| 5,917,155 A | | 6/1999 | Hake et al. |
| 6,056,995 A | * | 5/2000 | Hake ...................... H01B 3/421 427/118 |
| 6,288,342 B1 | | 9/2001 | Ueoka et al. |
| 6,319,604 B1 | | 11/2001 | Xu |
| 6,547,514 B2 | | 4/2003 | Lee |
| 6,676,366 B2 | | 1/2004 | Kao |
| 7,402,934 B1 | * | 7/2008 | Gabrys .................. H02K 3/345 310/179 |
| 8,070,426 B2 | | 12/2011 | Brunner et al. |
| 8,222,788 B2 | | 7/2012 | Rose |
| 8,664,817 B2 | * | 3/2014 | Rumbaugh ............. F04B 47/06 310/45 |
| 2008/0191575 A1 | * | 8/2008 | Varkey ..................... B32B 7/02 310/194 |
| 2009/0091202 A1 | * | 4/2009 | Parmeter ................ F04D 13/10 310/87 |
| 2009/0317264 A1 | * | 12/2009 | Manke .................... F04B 47/06 417/53 |
| 2010/0101828 A1 | | 4/2010 | Duarte Pena et al. |
| 2010/0148623 A1 | | 6/2010 | Liu |
| 2010/0181094 A1 | | 7/2010 | Duarte Pena |
| 2010/0288356 A1 | * | 11/2010 | Linic ..................... H01G 9/2031 136/256 |
| 2011/0192632 A1 | | 8/2011 | Abe et al. |

FOREIGN PATENT DOCUMENTS

| | | |
|---|---|---|
| EP | 0197227 * | 10/1986 |
| JP | 2003317547 A | 11/2003 |
| JP | 2008193860 A | 8/2008 |
| JP | 2011239537 A | 11/2011 |
| KR | 20110064243 A | 6/2011 |

OTHER PUBLICATIONS

Nowacki, J., et al., "Microstructure and characteristics of high dimension brazed joints of cermets and steel," Journal of Achievements in Materials and Manufacturing Engineering, Dec. 2009, 10 pages.

The State Intellectual Property Office of China "Notification of the First Office Action", for CN Application No. 201310134413.4, Mar. 22, 2016, 15 pages.

* cited by examiner

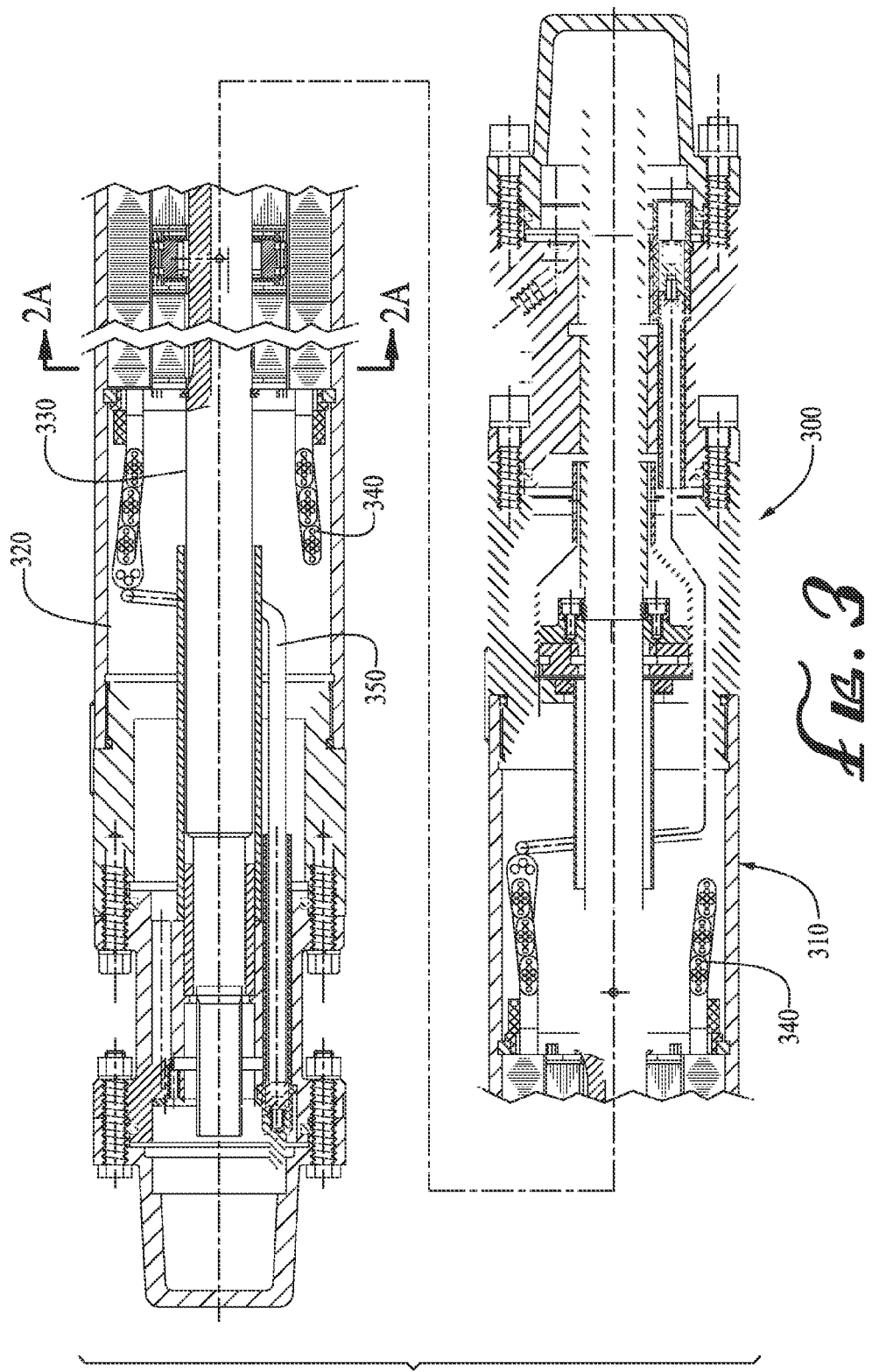

SYSTEM AND METHOD FOR ENHANCED MAGNET WIRE INSULATION

CROSS REFERENCE TO RELATED APPLICATIONS

This application claims the benefit of U.S. Provisional Application No. 61/636,003 to Parmeter et al., filed Apr. 20, 2012 and entitled "SYSTEM AND METHOD FOR ENHANCED MAGNET WIRE INSULATION," which is hereby incorporated by reference in its entirety.

BACKGROUND OF THE INVENTION

1. Field of the Invention

Embodiments of the invention described herein pertain to the field of magnet wire. More particularly, but not by way of limitation, one or more embodiments of the invention enable a system and method for enhanced magnet wire insulation for electric submersible pump applications.

2. Description of the Related Art

Currently available magnet wire is not appropriate for some motor applications. Particularly, magnet wire used in motors for oil or gas pumping applications should be exceptionally reliable. When a motor is used in an oil or gas well, a wire failure or short is especially costly as the motor is deep in the ground. If the insulation of the magnet wire in the motor forms cracks, these cracks can cause premature failure of the motor.

In the case of an electric submersible pump (ESP), a failure of the motor can be catastrophic as it means having to remove the unit from the well for repairs. ESP assemblies in particular require that the magnet wire used be capable of surviving the high temperatures deep below ground. In addition, ESP pumps may sometimes leak, allowing some water to enter the motor. A magnet wire that is appropriately waterproof so as to prevent a short when exposed to such leakage would be an advantage in all types of pumping applications. Finally, magnet wires often are damaged when they are transported, incurring breaks, nicks or pinholes. This damage decreases the life expectancy of the wire. A magnet wire with increased durability during transportation would be an advantage in all types of magnet wire applications.

Currently available magnet wire is sometimes insulated with polyimide film, for example Kapton® (a trademark of E. I. Du Pont De Nemours and Company) tape. Polyimide film is a type of synthetic polymeric resin of a class resistant to high temperatures, wear, and corrosion, used primarily as a coating or film on a substrate substance. While for brevity this description uses Kapton® as an example of polyimide film, nothing herein limits the invention to the use of a particular polyimide film such as Kapton® tape. While Kapton® has the highest dielectric strength of any wire insulation currently available, it does have inherent weaknesses. Kapton® readily takes on water (is hydroscopic) and then degrades rapidly. The adhesive used to attach Kapton® tape to the wire may also delaminate at the extreme high temperatures of deep wells. Magnet wire wrapped with Kapton tape is also prone to damage during transportation.

Another currently available insulation for magnet wire is organic polymer thermoplastic insulation, such as PEEK (polyetheretherketone). While PEEK has sufficient dielectric strength at room temperature, it drops off rapidly when used above 500° F. Motor temperatures in high temperature wells may reach in excess of 550° F. Thus, PEEK is also not ideal wire insulation for use in ESP motors.

Therefore, there is a need for a system and method to produce enhanced magnet wire insulation that is more waterproof, durable during shipping and also reliable at the high temperatures for ESP applications.

BRIEF SUMMARY OF THE INVENTION

One or more embodiments of the invention enable a system and method for enhanced magnet wire insulation for ESP applications.

A system and method for enhanced magnet wire insulation is described. The system of the invention may comprise an electric submersible pump system employing an enhanced magnet wire insulation, the system comprising a pump; an induction motor suitable for use as an electrical submersible motor, the induction motor coupled to the pump so as to turn the pump; a magnet wire windingly coupled to the electrical submersible motor, the magnet wire comprising enhanced insulation suiting it for use in temperatures of about and above 550° Fahrenheit (F), the enhanced insulation further comprising a layer of polyimide tape coupled to the magnet wire and the layer of polyimide tape further encased within a layer of organic polymer thermoplastic insulation. In some embodiments, the layer of polyimide tape is Kapton®. In some embodiments, the organic polymerthermoplastic is PEEK The method of the invention may comprise a method of making an enhanced magnet wire insulation suited for an electric submersible pump application, the method comprising drawing copper magnet wire to size; cleaning the copper magnet wire; pulling the copper magnet wire through a polyimide tape wrap machine to produce wrapped copper magnet wire; redrawing the wrapped copper magnet wire through an extrusion mold, applying a molten organic polymer thermoplastic to the wrapped copper magnet wire to produce enhanced magnet wire; winding the enhanced magnet wire into an induction motor. In some embodiments, the organic polymer thermoplastic is PEEK. In certain embodiments, the polyimide tape is Kapton®.

The induction motor of the system of an illustrative embodiment may comprise a variety of types of motors known in the art for use as electric submersible motors. For example, a three phase "squirrel cage" induction motor well known in the art, as well as permanent magnet (PM) motors. Both these and other motors suitable for use with an ESP assembly may benefit from the enhanced magnet wire insulation of the system and method of the invention.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

The above and other aspects, features and advantages of the invention will be more apparent from the following more particular description thereof, presented in conjunction with the following drawings wherein:

FIG. 3 illustrates an exemplary ESP employing a three-phase induction motor for use in one or more embodiments of the system of the invention.

Figure 1:
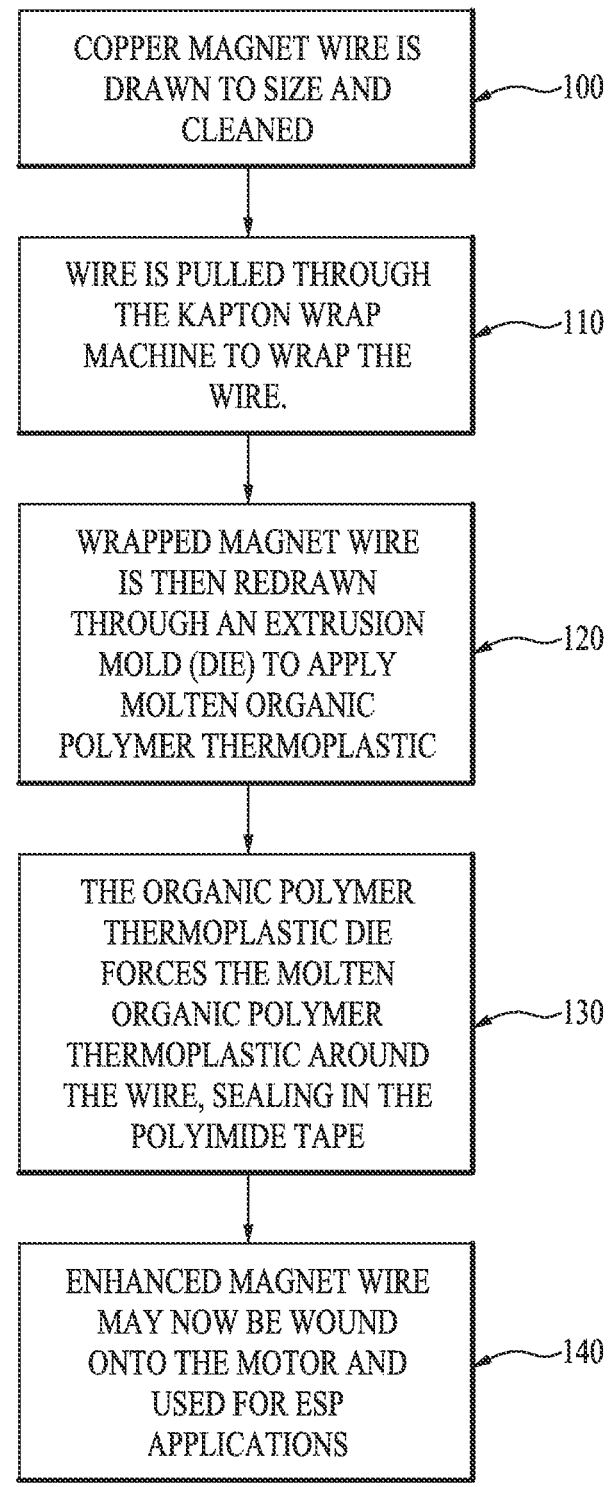
FIG. 1 is a flowchart illustrating an exemplary method of making enhanced magnet wire insulation for use in an electric submersible pump (ESP) system.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

A system and method for enhanced magnet wire insulation will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a wire includes one or more wires.

"Coupled" refers to either a direct connection or an indirect connection (e.g., at least one intervening connection) between one or more objects or components. The phrase "directly attached" means a direct connection between objects or components.

One or more embodiments of the invention provide a system and method for enhanced magnet wire insulation for use in electric submersible pump applications. While the invention is described in terms of an oil or gas pumping embodiment, nothing herein is intended to limit the invention to that embodiment.

The system of the invention comprises an electric submersible pump (ESP) system. The ESP system of an illustrative embodiment comprises a magnet wire, enhanced insulation for the magnet wire, a pump 420 and an electrical submersible motor 300. FIG. 1 illustrates one or more methods of making enhanced magnet wire insulation for use in an electric submergible pump (ESP) system. At step 100, copper magnet wire 250 may be drawn to size and cleaned using methods known in the art. At step 110, the copper magnet wire 250 may be pulled through a polyimide film (tape) wrap machine to wrap the wire. The polyimide tape 230 may contain adhesive on its surface or the adhesive may be separately applied. This adhesive makes contact with the wire and may be heat activated, providing a bond to the wire. One type of polyimide tape 230 that may be used is poly(4,4'-oxydiphenylene-pyromellitimide), also known as Kapton®. Various types of polyimide tape 230 may be suitable, such as Kapton® tape types FN, HN and HPP-ST, for example. Other polyimide tapes having similar chemical properties may also be used. While polyimide tape 230 has the highest dielectric strength of any wire insulation currently available alone, it has significant mechanical disadvantages when used in ESP applications. First, polyimide tape 230 is hydroscopic (it readily takes on water) and degrades in the presence of water. In a deep well, such as an oil or gas well, it is possible for small amounts of water to enter the motor, leaving the polyimide tape insulation vulnerable to a short, which is a critical system failure. As the ESP motor is deep within an oil well such failures are catastrophic. Another known problem with polyimide tape insulation is that it may delaminate at extremely high temperatures, such as above 300 degrees Fahrenheit. Additionally, transporting magnet wire with polyimide insulation may cause nicks or pinholes in the insulation, reducing its lifespan and effectiveness. Further, excessive vibration may also weaken the adhesive of the polyimide tape. This mechanical disadvantage of polyimide may cause the tape to come loose and cause a direct short in the motor. Finally, if the wire is not extremely clean when the polyimide tape is applied, the adhesive will not adhere properly and the polyimide may be easily damaged during winding, which may also lead to a short in the winding.

To overcome these and other disadvantages of the polyimide tape, for example, at step 120 the polyimide wrapped magnet wire is then redrawn through an extrusion mold (die) to apply an organic polymer thermoplastic 240, such as molten PEEK (polyetheretherketone) to the wrapped wire, creating a twice-insulated wire 220. Other organic polymers thermoplastics having similar chemical properties as PEEK may also be employed. At step 130, the PEEK die forces the molten organic polymer thermoplastic 240 around the wire, sealing in the polyimide tape 230 and creating an enhanced magnet wire. At step 140, enhanced magnet wire may now be wound onto the motor in a conventional fashion and used for ESP applications.

In the method of an illustrative embodiment it should be noted that it is possible to splice together two pieces of enhanced magnet wire and still have a seamless, homogenous insulation coating over the underlying polyimide tape 230. To do so, a PEEK shrink tube, for example, may be slipped over one of the enhanced magnet wires to be spliced. Next, the ends of the two enhanced magnet wires may be forced together using an appropriate wire press and dies with sufficient force that it cold welds the wires together. The resulting flash may be filed smooth and polyimide tape 230 may be applied over the bare wire. The PEEK shrink tube may then be slipped over (and centered) over the splice. Finally, a small "clam shell" heater or similar device may be placed around the splice. The heater may then be turned on until the temperature near the splice reaches 700° F. The heater should then be immediately turned off and removed. The 700° F. temperature is significant because at that temperature the PEEK shrink tube (and those with other similar chemical properties) (and PEEK on the wire) will solidify and fuse together, creating a seamless splice.

Figure 2B:
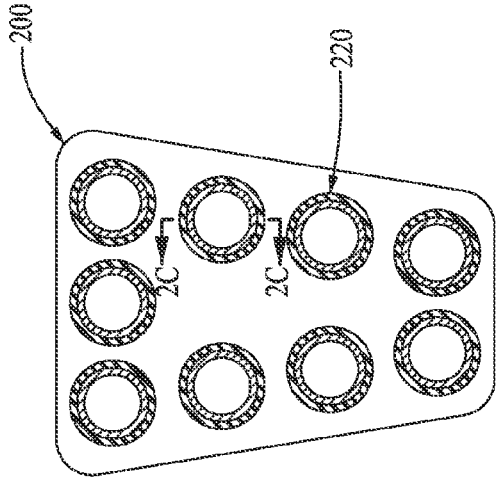
FIG. 2B shows detail of a single wire slot comprising exemplary enhanced magnet wires employing the insulation of an illustrative embodiment of FIG. 2A.
Figure 2A:
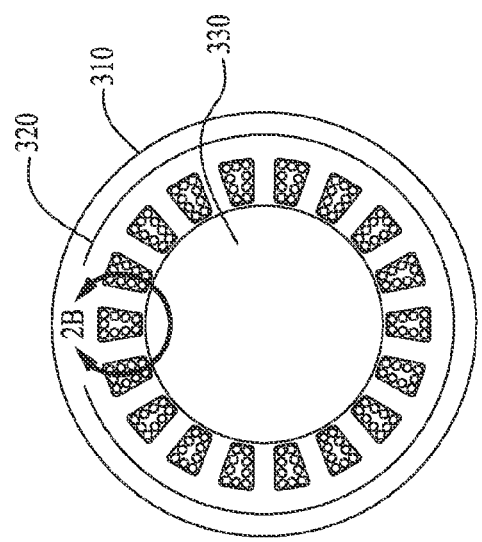
FIG. 2A illustrates a cross sectional view taken along line 2A-2A of FIG. 3 of an ESP motor containing a number of slots comprising the exemplary enhanced magnet wires employing the insulation of one or more illustrative embodiments of the invention.

FIG. 2A illustrates in detail one or more arrangements of copper wire windings insulated with the enhanced magnet wire insulation of the invention. FIG. 2A is a cross section along line 2A-2A of FIG. 3 and shows a cross sectional view of a stator encompassing rotor assembly 330. Organic polymer thermoplastics, such as for example PEEK, may be used to create a wire insulation that is not affected by water and is without bonding issues. Organic polymer thermoplastics such as PEEK have a low coefficient of friction that provides an advantage when winding a stator. PEEK may also stand up well to transport and winding because it has no seams or wraps, so it is not easily damaged during shipping or winding. PEEK alone, however, is not advantageous for magnet wire insulation for ESP applications as its dielectric strength drops off rapidly above 500° F.

The enhanced magnet wire of the invention combines the advantages of greatly improved quality and reliability of insulation. The enhanced magnet wire will have a tough and smooth surface that may not require varnish or epoxy coating as chaffing may no longer be a concern. In addition, this advantage saves time and cost in production. The lower coefficient of friction of an organic polymer thermoplastic 240 may improve the winding process, for example by make the insertion of the insulated wire into the stator slots easier, reducing the potential of damage to the wire during the winding process and reducing physical effort required by personnel in the winding process. The resultant enhanced magnet wire may importantly be more water proof than wire insulated with either prior insulation alone. When combined into a system with a three-phase induction, PM or other motor for ESP applications, this method produces an improved system for oil or gas well drilling. This method, and other embodiments thereof as contemplated by those of skill in the art using these materials, may produce enhanced magnet wire that may then be wound onto the motor and used for ESP applications with increased reliability over previous solutions.

FIG. 2B illustrates the detail of an exemplary slot of portion of FIG. 2A. Exemplary enhanced magnet wire 220 is shown in a slot in FIG. 2B. Magnet wire 250 is shown protected by two layers of insulation, as in one or more embodiments of the invention, to form enhanced magnet wire 220. Enhanced magnet wire 220 may be protected using a combination of layers of the enhanced magnet wire insulation of one or more embodiments of the invention.

Figure 2C:
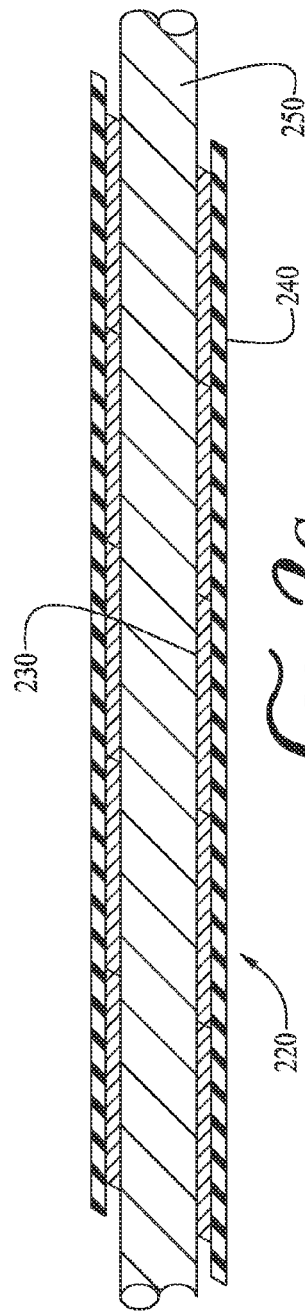
FIG. 2C shows a cross sectional view taken along line 2C-2C of FIG. 2B illustrating a combination of insulation layers of an exemplary magnet wire.

FIG. 2C shows a cross section across line 2C-2C of FIG. 2B of enhanced magnet wire 220. Copper magnet wire 250 is encased in polyimide tape 230, which is itself encased within organic polymer thermoplastic 240 to produce one or more embodiments of the enhanced magnet wire 220 of the invention. The advantages of the enhanced insulation and the method and system described herein are not limited to a single layer of each type of insulation and one of ordinary skill in the art could contemplate logical extensions thereof, all of which are embodiments of the invention.

FIG. 3 illustrates an exemplary ESP employing three-phase induction motor 300 for use in one or more embodiments of the system of the invention. While the embodiments are not limited to use in three-phase induction motor 300, such a motor may be used in the system of the invention to enhance the advantages of the enhanced magnet wire insulation. Three-phase induction motor 300 of the system of the invention may be, for example, a three-phase "squirrel cage" induction motor that is well known in the art. In some embodiments, the enhanced magnet wire 220 may be hand-wound on motor 300. Motor 300 of the system of the invention may operate from 15 to 1,000 horsepower, though the invention is not limited to this example. End coils 340 and main lead wire 350 are also shown. Main lead wire 350 connects to a power cable for motor 300.

Figure 4:
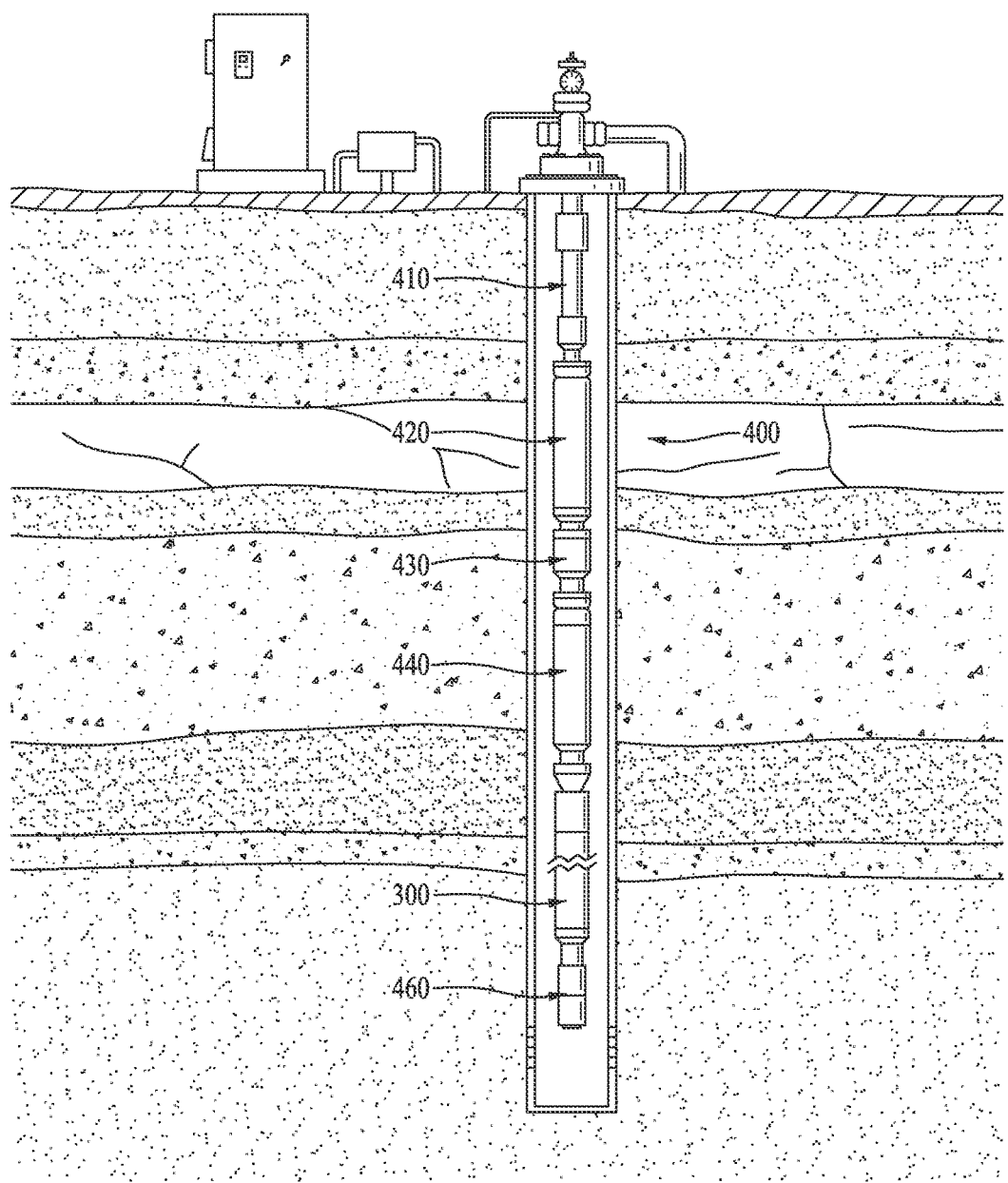
FIG. 4 graphically illustrates an exemplary electric submersible pump (ESP) assembly deployed underground, the ESP comprising one or more embodiments of the enhanced magnet wire of an illustrative embodiment.

FIG. 4 provides a graphic illustration an exemplary ESP system 400 arranged to pump gas or oil and making use of the enhanced wire insulation of the invention. As illustrated, the system further comprises a power cable, production string 410, multistage pumps 420, gas separators, intake 430, one or more seals 440, downhole sensors 460, and motors such as motor 300 utilizing enhanced magnet wire 250. Casing sizes for the ESP illustrated may range from about 4.5 inches to 9 inches O.D., though the invention is not limited to these exemplary embodiments.

The run life of an ESP system may be directly related to the quality and reliability of the power cable. Power cables for the system of the invention may be round or flat and configured to function in temperatures ranging from around −60° F. to about 450° F. Power cables of the system should provide extreme durability and reliability in conditions including resistance to decompression and fatigue with corrosion-resistant barriers that resist fluids and gas. Cables manufactured to ISO 9001 standards may be preferred in one or more embodiments of the invention.

The system of the invention may alternatively comprise a permanent magnet (PM) motor. PM motors use a wound stator that may benefit from the enhanced insulated magnet wire described herein. Such motors are well known in the art. Other motors suitable for ESP applications may also be used as part of the system of the invention.

While the invention herein disclosed has been described by means of specific embodiments and applications thereof, numerous modifications and variations could be made thereto by those skilled in the art without departing from the scope of the invention set forth in the claims. The foregoing description is therefore considered in all respects to be illustrative and not restrictive. The scope of the invention is indicated by the appended claims, and all changes that come within the meaning and range of equivalents thereof are intended to be embraced therein.

What is claimed is:

1. An electric submersible pump system employing an enhanced magnet wire insulation, the system comprising:
   a pump;
   an induction motor suitable for use as an electric submersible motor, the induction motor coupled to the pump so as to turn the pump; and
   a plurality of magnet wires windingly coupled to the electric submersible motor, each magnet wire of the plurality of magnet wires comprising enhanced insulation suiting it for use in temperatures of about 550° Fahrenheit, the enhanced insulation comprising:
   a layer of polyimide tape around each magnet wire; and
   the layer of polyimide tape of each magnet wire circumferentially encased within a layer of organic polymer thermoplastic insulation, wherein the organic polymer thermoplastic insulation is PEEK.

2. The system of claim 1, wherein the polyimide tape is poly(4,4'-oxydiphenylene-pyromellitimide) tape.